United States Patent [19]
Song

[11] Patent Number: 5,859,679
[45] Date of Patent: Jan. 12, 1999

[54] USING C-SHAPED REPAIR LINES AND METHOD FOR REPAIRING LIQUID CRYSTAL DISPLAY USING THE SAME

[75] Inventor: In Duk Song, Kyungki-do, Rep. of Korea

[73] Assignee: LG Electronics, Inc., Seoul, Rep. of Korea

[21] Appl. No.: 891,208

[22] Filed: Jul. 11, 1997

[30] Foreign Application Priority Data

Jul. 11, 1996 [KR] Rep. of Korea ................... 1996/27955

[51] Int. Cl.⁶ ........................... G02F 1/1333; G02F 1/13; G02F 1/1345; G02F 1/1343
[52] U.S. Cl. ........................... 349/54; 349/192; 349/152; 349/55
[58] Field of Search ................. 349/54, 55, 192, 349/152, 139

[56] References Cited

U.S. PATENT DOCUMENTS

| | | | |
|---|---|---|---|
| 4,807,973 | 2/1989 | Kawasaki | 350/332 |
| 5,202,778 | 4/1993 | Niki | 349/54 |
| 5,303,074 | 4/1994 | Salisbury | 359/59 |
| 5,475,246 | 12/1995 | Wei et al. | 257/291 |
| 5,608,245 | 3/1997 | Martin | 3257/291 |
| 5,684,547 | 11/1997 | Park et al. | 359/59 |
| 5,714,770 | 2/1998 | Kim | 349/192 |
| 5,729,309 | 3/1998 | Na et al. | 349/54 |

FOREIGN PATENT DOCUMENTS 403085524A  4/1991  Japan ........................................ 349/54

*Primary Examiner*—William L. Sikes
*Assistant Examiner*—Tarifur R. Chowdhury
*Attorney, Agent, or Firm*—Morgan, Lewis & Bockius LLP

[57] ABSTRACT

A repair system for a liquid crystal display includes a plurality of gate lines and orthogonally disposed data lines crossing the gate lines, with pixels being formed at crossing points of each gate and data lines. The pixels collectively define a display region. The repair system includes a plurality of repair lines with each of the repair lines having a portion disposed along a first side of the display region and a portion disposed along a second opposite side of the display region. The repair lines are arranged so that at least two of a plurality of signal lines is overlapped by the repair lines.

16 Claims, 13 Drawing Sheets

USING C-SHAPED REPAIR LINES AND METHOD FOR REPAIRING LIQUID CRYSTAL DISPLAY USING THE SAME

This application claims the benefit of Korean Patent Application No. 27955/1996 filed Jul. 11, 1996, which is hereby incorporated by reference.

BACKGROUND OF THE INVENTION

1. Field of the Invention

The present invention relates to a liquid crystal display, and more particularly, to a repair system for a liquid crystal display and a method for repairing a liquid crystal display using the same, in which a plurality of repair lines are formed side by side on the sides of the signal input/output for the efficient restoring of severed signal lines.

2. Discussion of the Related Art

FIGS. 1a and 1b are schematic plan views of the conventional repair line systems disclosed in U.S. Pat. No. 4,807,973, the disclosure of which is herein expressly incorporated by reference.

Referring to FIG. 1a, the closed loop repair line system to U.S. Pat. No. 4,807,973, includes a closed loop repair line 7 formed around a display having gate lines 1 and data lines 2 formed to cross each other and forming a pixel at each crossing point. Each line is connected to an electrode 4a or 5a, respectively, on the signal input side of the display (the bottom side and the right side of FIG. 1a) and an electrode 4b or 5b (the top side and left side of FIG. 1a), respectively, opposite the side of the signal input.

In a liquid crystal display having the conventional closed loop repair line system 7, upon the occurrence of a severed line 3 in the gate line 1 or the data line 2, the severed line (the gate line 1 in FIG. 1a) is connected to the repair line 7 with a conductive material 8 on the side of the signal input as well as on the side opposite the side of the signal input surrounding the display. That is, a severed gate line 1 or a data line 2 can be repaired using the repair line 7 surrounding the display allowing input of a signal even to the severed line on the side severed opposite the signal input electrode 4a and 5a.

FIG. 1b illustrates a repair line system having opened portions at opposite sides of the repair line system.

Referring to FIG. 1b, the repair system includes two repair lines 7a and 7b each having open points 6 formed at opposing sides of the display and formed around the display having the same gate lines 1 and data lines 2 as depicted in FIG. 1a.

In this repair system, breaks or cuts in lines 3 occur in the gate lines 1, each of the severed lines (the two gate lines 1 in FIG. 1b) are connected to the respective repair line 7a or 7b with a conductive material 8, on the side of the signal input as well as on the side opposite the signal input side, surrounding the display. That is, two severed gate lines 1 can be repaired using the repair lines 7a and 7b surrounding the display to allow input of a signal even to the severed line on the side opposite to the side of the signal input electrodes 4a and 5a.

However, both the conventional closed loop and simple opened line repair system have drawbacks. First, with the closed loop repair system multiple severed lines are not repairable. The repair of a severed line using the closed loop repair line system also increases the line resistance, which impedes the transmission of signals. Second, the simple opened repair line system can repair multiple severed lines, although severed lines lying adjacent to each other are not repairable.

SUMMARY OF THE INVENTION

Accordingly, the present invention is directed to a repair system for a liquid crystal display and a method for repairing a liquid crystal display using the same that addresses these drawbacks in the prior art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the repair system for a liquid crystal display, the liquid crystal display having a plurality of gate lines and orthogonally disposed data lines crossing the gate lines, a pixel disposed at the crossing point of each gate and each data line, the pixels collectively defining a display region, including first and second repair lines having a first segment along a first side of the display region and a second segment along a second side of the display region, the first segment conductively connected to the second segment, the first and second segments capable of repairing any two adjacent ones of the signal lines.

In a similar aspect of the present invention, the repair system for a liquid crystal display, the liquid crystal display having an array of signal lines including a plurality of gate lines and a plurality of orthogonally disposed data lines crossing the gate lines, a pixel disposed at the crossing point of each gate line and each data line, the pixels collectively defining a display region, including first and second repair lines, each of the repair lines having a first segment along a first side of the display region and a second segment along a second side of the display region, the first segment being conductively connected to the second segment, the first and second segments capable of repairing at least one of the data lines and one of the gate lines.

In a further aspect of the present invention, the repair system for a liquid crystal display, the liquid display having an array of signal lines including a plurality of gate lines and a plurality of orthogonally disposed data lines crossing the gate lines, a pixel disposed at the crossing point of each gate line and each data line, the pixels collectively defining a display region, including first and second repair lines, each of the repair lines having a first segment along a first side of the display region and a second segment along a second side of the display region, the first segment being conductively connected to the second segment, the first segment of the first repair line along the first side of the display being arranged substantially parallel and adjacent to the first segment of the second repair line, along the first side of the display.

In a final aspect of the present invention, the repair system for a liquid crystal display, the liquid display having an array of signal lines including a plurality of gate lines and a plurality of orthogonally disposed data lines crossing the gate lines, a pixel disposed at the crossing point of each gate line and each data line, the pixels collectively defining a display region, including a repair line having a first segment along a first side of the display region, a second segment along a second side of the display region, and a third segment coupling the first segment to the second segment, the first and the second segments being disposed to cross the signal lines, and the third segment being disposed to not cross the signal lines.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated into and constitute a part of this specification, illustrate embodiments of the invention and together with the description serve to explain the principles of the invention.

In the drawings.

DETAILED DESCRIPTION OF THE PREFERRED EMBODIMENTS

Figure 2A:
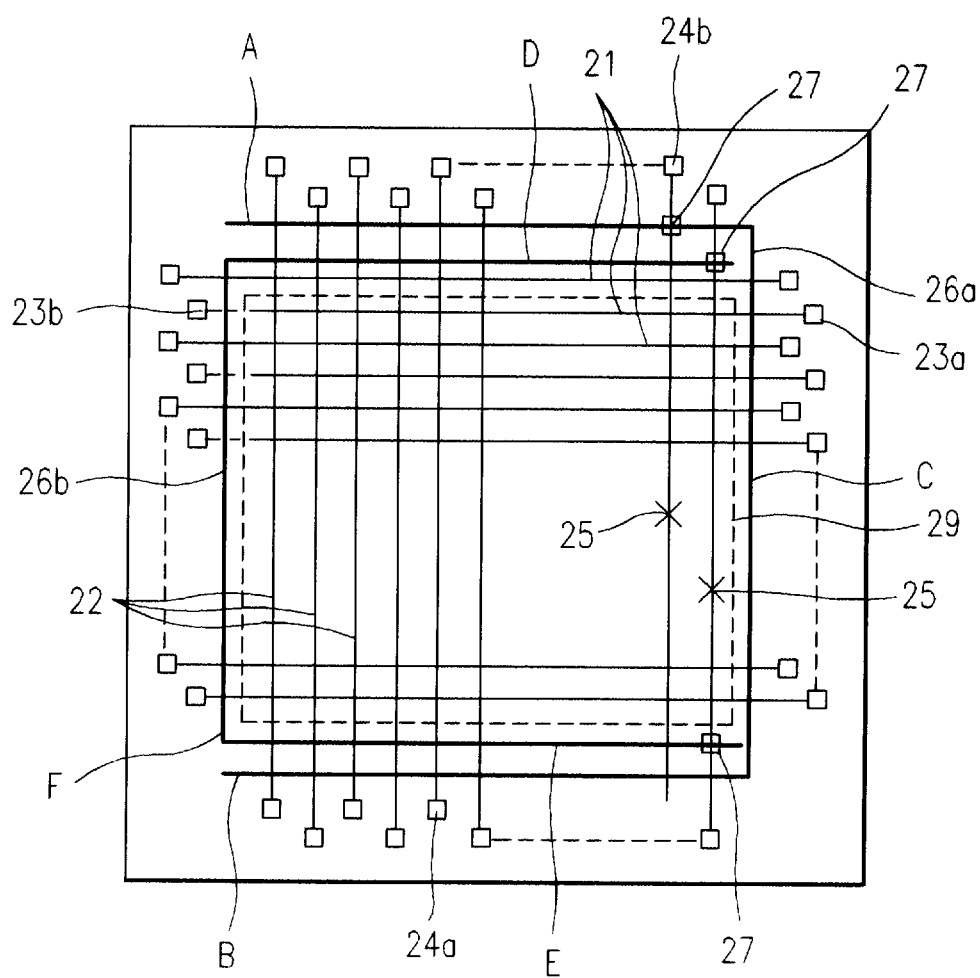
FIGS. 2a and 2b are schematic plan views of a first embodiment of a repair line system of the present invention.
Figure 2B:
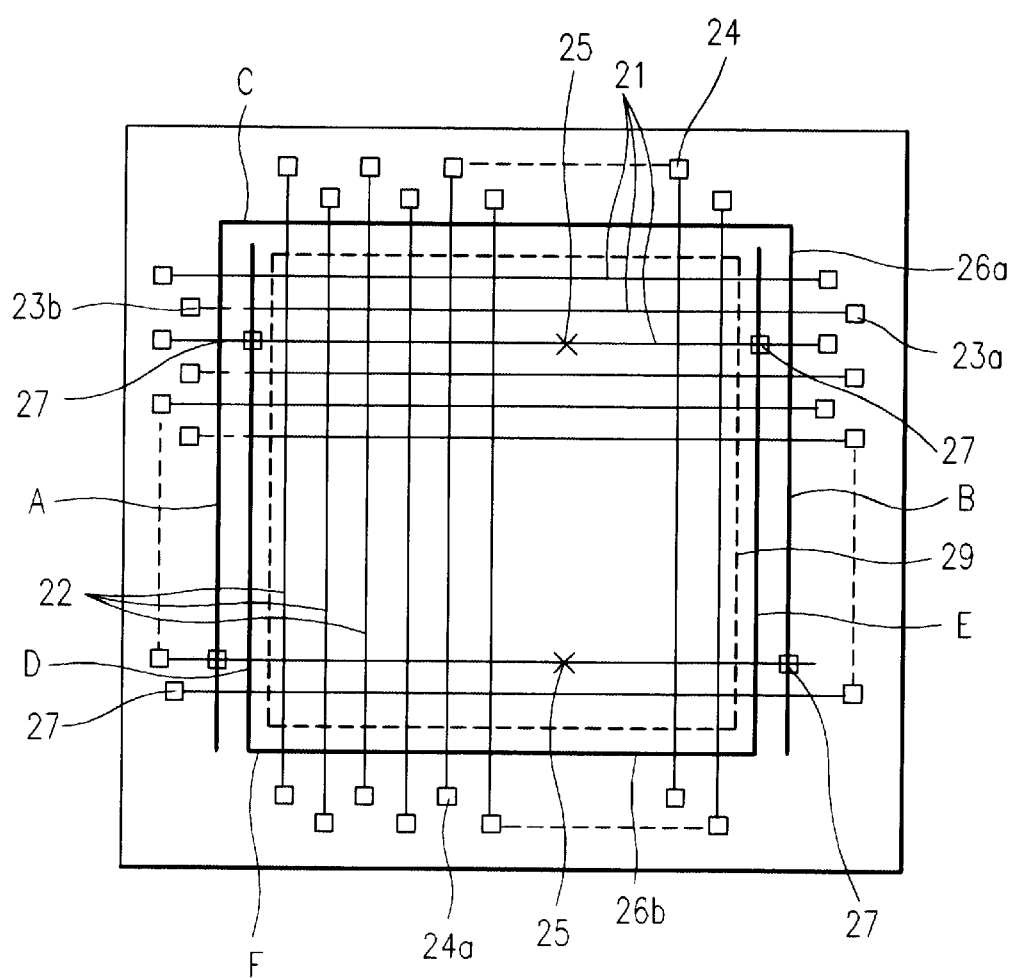

Reference will now be made in detail to the preferred embodiments of the present invention, examples of which are illustrated in the accompanying drawings. FIGS. 2a and 2b illustrate schematically two versions of a first embodiment of a repair line system, one version applicable to repair of severed data lines (FIG. 2a) and the other version applicable to severed gate lines (FIG. 2b) of the present invention. The general configuration of the two versions of the first embodiment are identical except for the orientation of the nested repair lines 26a and 26b, with respect to the data lines and gate lines, corresponding to the anticipated repair of either data or gate lines, respectively.

The repair line system, depicted in FIG. 2a, is directed towards the repair of data lines and includes a first data repair line 26a, and a second data repair line 26b, formed in the area surrounding a display region 29. The display 29 has gate lines 21 and data lines 22 formed to cross each other, with each gate line connected to a input gate pad 23a and an output gate pad 23b, and each data line connected to an input data pad (or input signal electrode) 24a and an output data pad (or output signal electrode) 24b. Pixels are formed at the crossing points of the gate lines 21, and each data line connected to an input data pad 24a and output data pad 24b the data lines 22.

Repair line 26a is generally C-shaped, and formed of three segments A, B, and C. Segment A is disposed along one side of display region 29 overlapping all of the data lines at their input ends. Segment B is disposed on the side of the display region opposite the segment A, and overlaps all other data lines of their opposite, output ends. Segment C is disposed along a third side of the display region 29 and couples segment A to segment B, making repair line 26a a complete conductive path around the display region 29 from the input end of any data line to the output end of that data line. Similarly, the repair line 26b is comprised of three segments D, E, and F, corresponding to segments A, B, and C of repair line 26a, except that repair line 26b is oriented opposite to repair line 26a so that segments F lies on the side of the display region 29 opposite to segment C of repair line 26a. Thus the repair lines have a segment disposed across the input and output ends of all the data lines. This arrangement of doubled repair lines segments across the data lines permits the repair of any two severed data lines in the display 29. The first and second repair lines 26a and 26b are formed concurrently with the gate lines 21.

When breaks or cuts 25 occur to the data lines 22, each of the severed lines (the two data lines 22 in FIG. 2a) is connected to the appropriate repair line 26a or 26b on the side of the signal input as well as on the side opposite the side of the signal input, passing around the display 29 to repair the severed lines. A laser beam is applied to an insulating film between the repair line and the severed line, in a repair region 27 surrounding the intersection of the repair line and the severed line, to break the insulating film and fusion weld the severed line to the repair line. This technique does not require as much space between the signal lines of the prior art techniques employing conductor leads. The signal lines can therefore be formed with a greater width outside the display region than within the display region, giving a greater area of overlap of the site of the repair 27. Thus, by repairing the two severed data lines 22 using the repair lines 26a and 26b surrounding the display 29, the repair line system also allows signal inputs to the severed lines on the side opposite the signal input electrodes 24a.

The repair line system, depicted in FIG. 2b, is directed towards the repair of severed gate lines, rather than data lines. Therefore, the repair lines are arranged so that they each have segments crossing both ends of all of the gate lines of FIG. 2a, except the nested repair lines 26a and 26b are rotated 90° in a counter-clockwise direction. They each have segments crossing both ends of all of the gates lines.

The repair line system of the second embodiment, depicted in FIGS. 3a–3d, is substantially the same as the repair system described in the first embodiment, except in regard to the orientation of the repair lines and the types of repairs that it is capable of effectuating, which will be described in detail below.

Figure 3A:
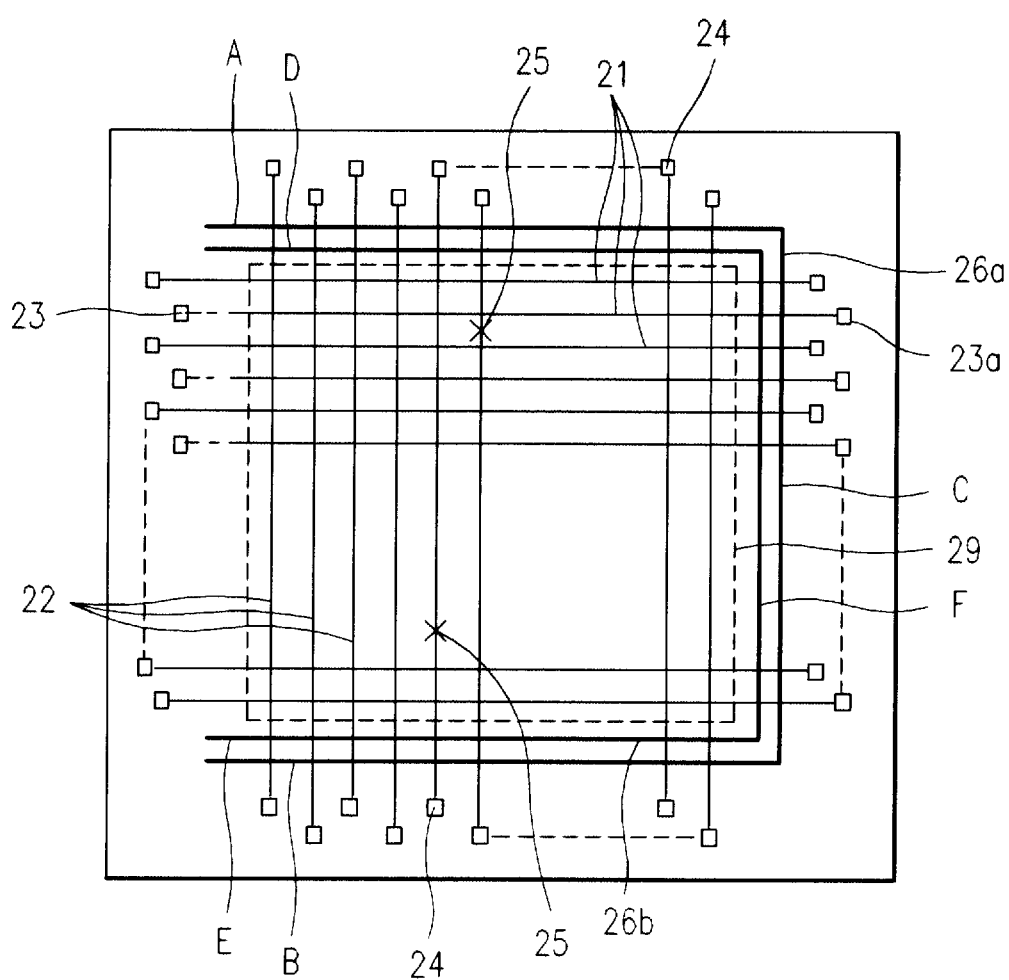
FIGS. 3a–3d are schematic plan views of a second embodiment of a repair line system of the present invention.
Figure 3B:
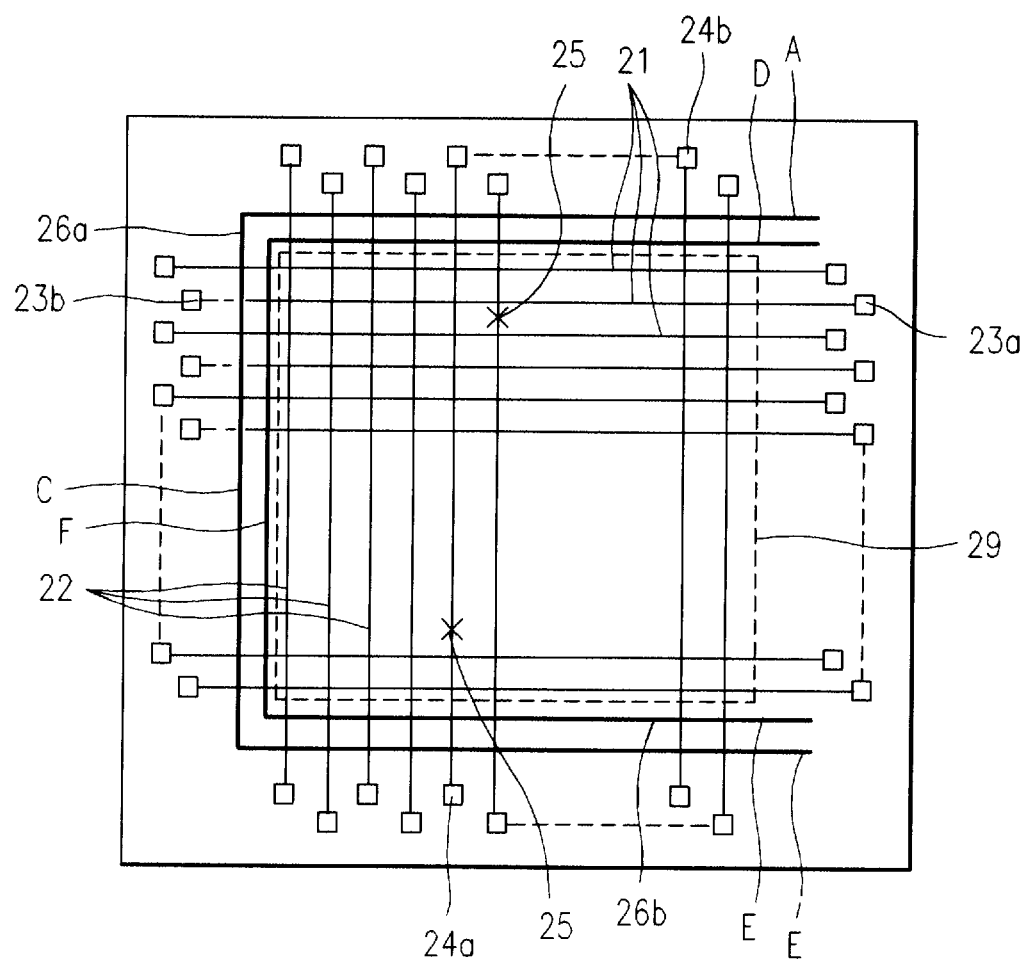

FIGS. 3a and 3b illustrate schematically plan views each depicting a repair line system directed towards the repair of data lines of the present invention.

Figure 3C:
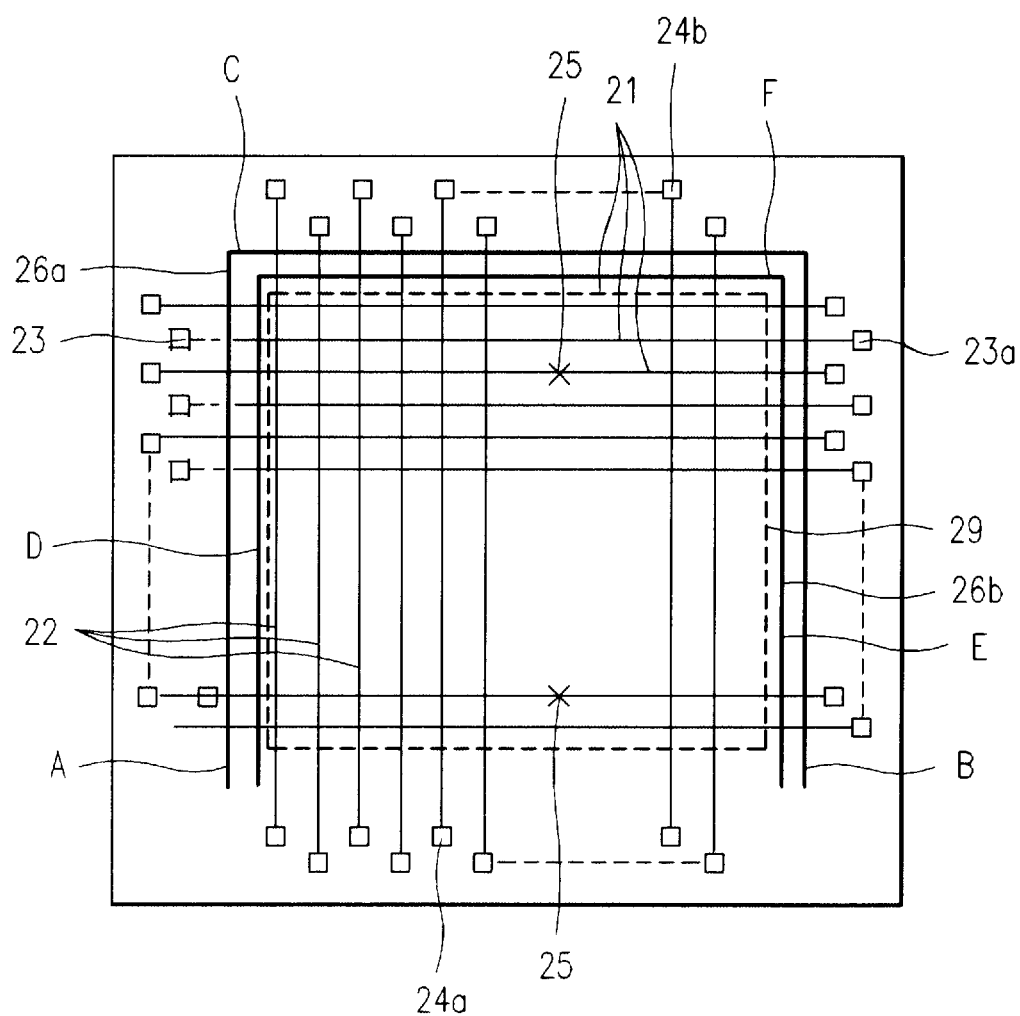
Figure 3D:
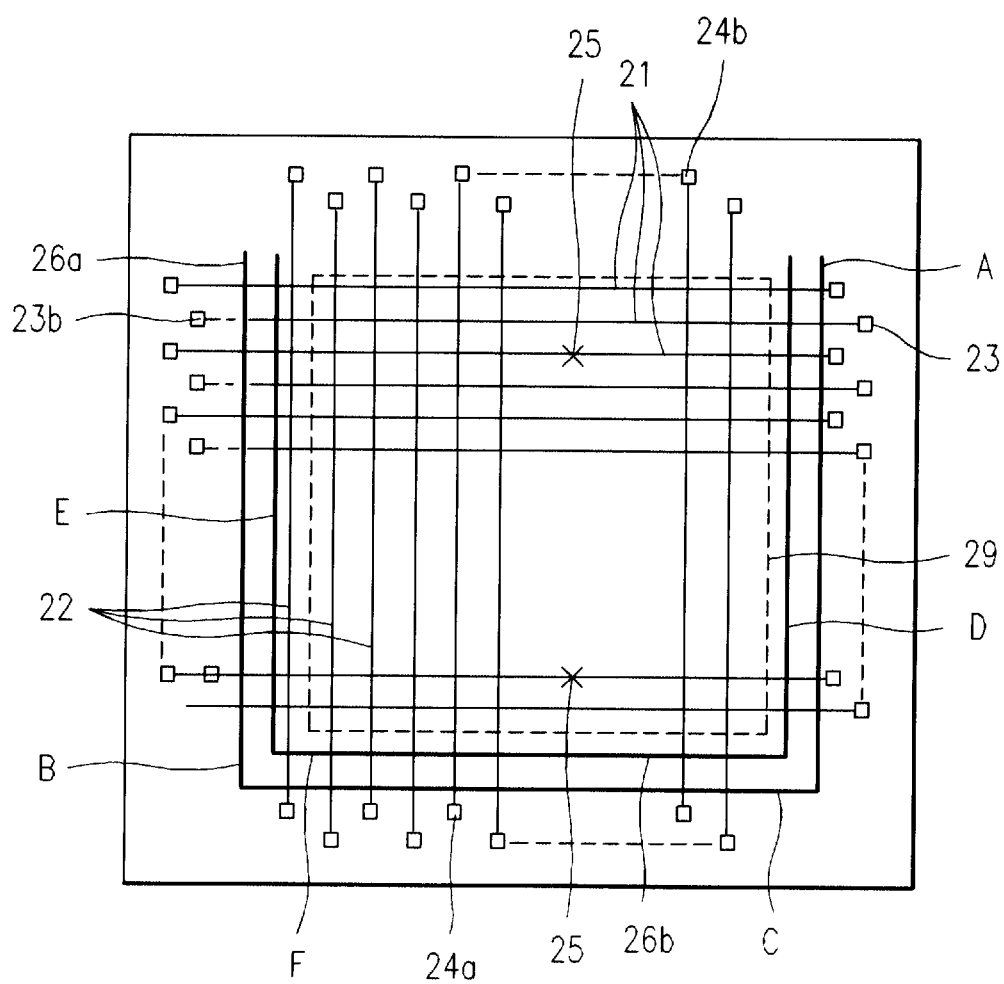

FIGS. 3c and 3d illustrate schematically plan views each depicting a repair line system directed towards the repair of gate lines of the present invention.

The second embodiment includes a first data repair line 26a, and a second data repair line 26b, formed in the area surrounding a display region 29. The display 29 has gate lines 21 and data lines 22 formed to cross each other, with each gate line connected to a input gate pad (or input signal electrode) 23a and an output gate pad (or output signal electrode) 23b, and each data line connected to an input data pad 24a and an output data pad 24b. Pixels are formed at the crossing points of each of the gate lines 21 and the data lines 22.

The second embodiment differs from the first embodiment, as described above, in that the nested repair lines of the second embodiment are formed so that the first and the second repair lines are arranged with segments along the same three sides of the display, thereby leaving one side of the gate lines, as depicted in FIGS. 3a and 3b, not crossed by either one of the repair lines and leaving one side of the data lines, as depicted in FIGS. 3c and 3d, not crossed by either one of the repair lines. Whereas the first embodiment is capable of repairing a pair of adjacently severed data (FIG. 2a) or gate (FIG. 2b) signal lines, the second embodiment is capable of repairing only adjacently severed data signal lines if the configurations depicted in FIGS. 3a and 3b are employed and is capable of repairing only adjacently severed gate lines if the configurations depicted in FIGS. 3c and 3d are employed.

These configurations, as depicted in FIGS. 3a–3d, are preferred in situations in which there is no sufficient space surrounding the display region 29 to form a repair line segment on every side of the display region 29. Taking the line segments B and E of FIG. 3a as the top of the nested repair lines, FIGS. 3b–3d represent the nested repair lines of FIG. 3a being rotated in the clockwise direction, 180°, 270°, and 90°, respectively. Factoring in the defect occurrence probability in the fabrication of the signal lines of a liquid crystal display, it is preferred to arrange the repair lines as shown in FIGS. 3b formed side by side except on the side of the signal input terminals to the gate lines.

Figure 4A:
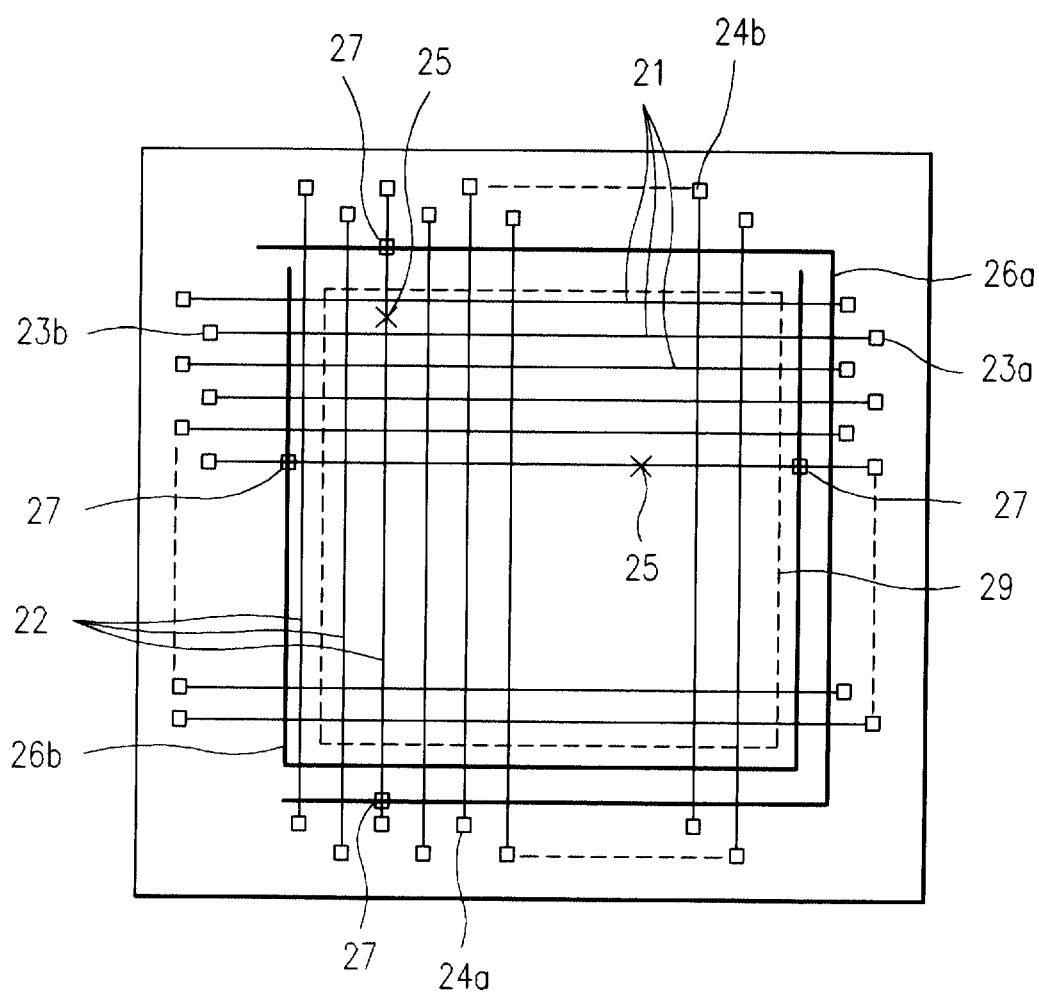
FIGS. 4a–4d are schematic plan views of a third embodiment of a repair line system of the present invention.
Figure 4B:
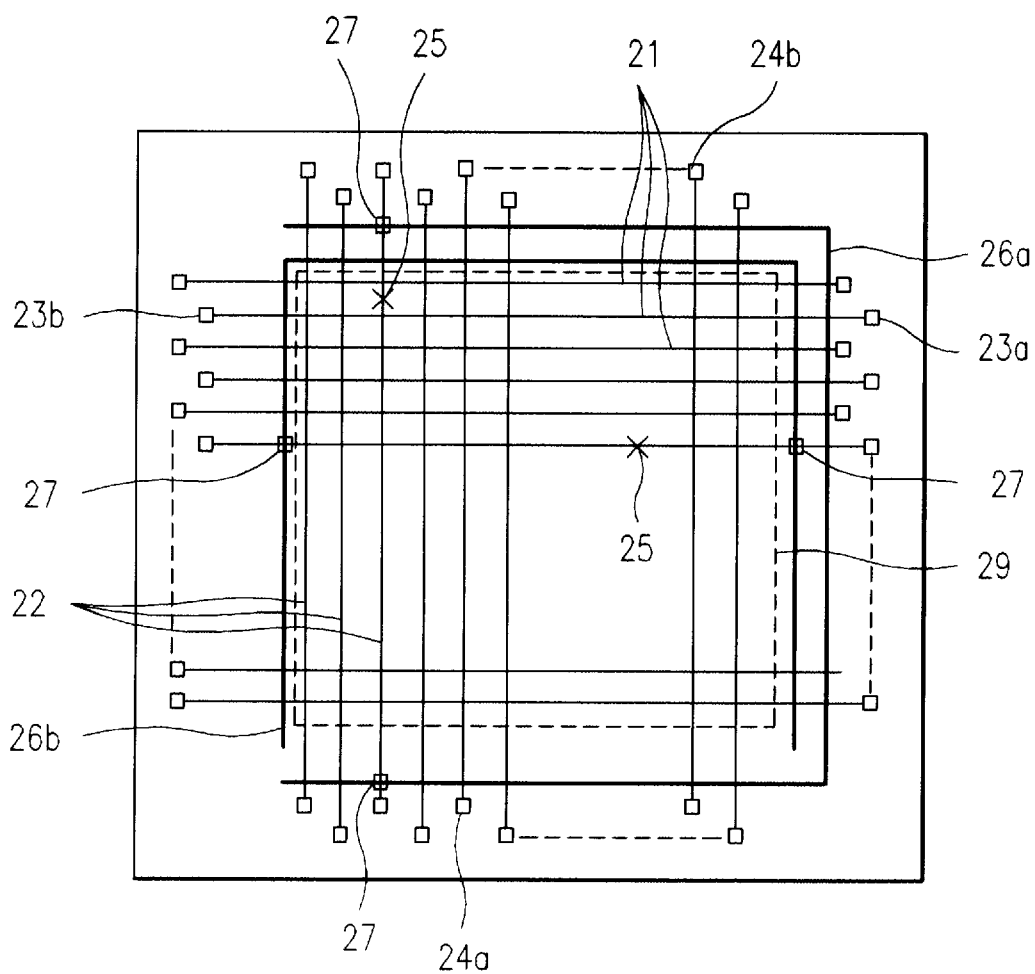
Figure 4C:
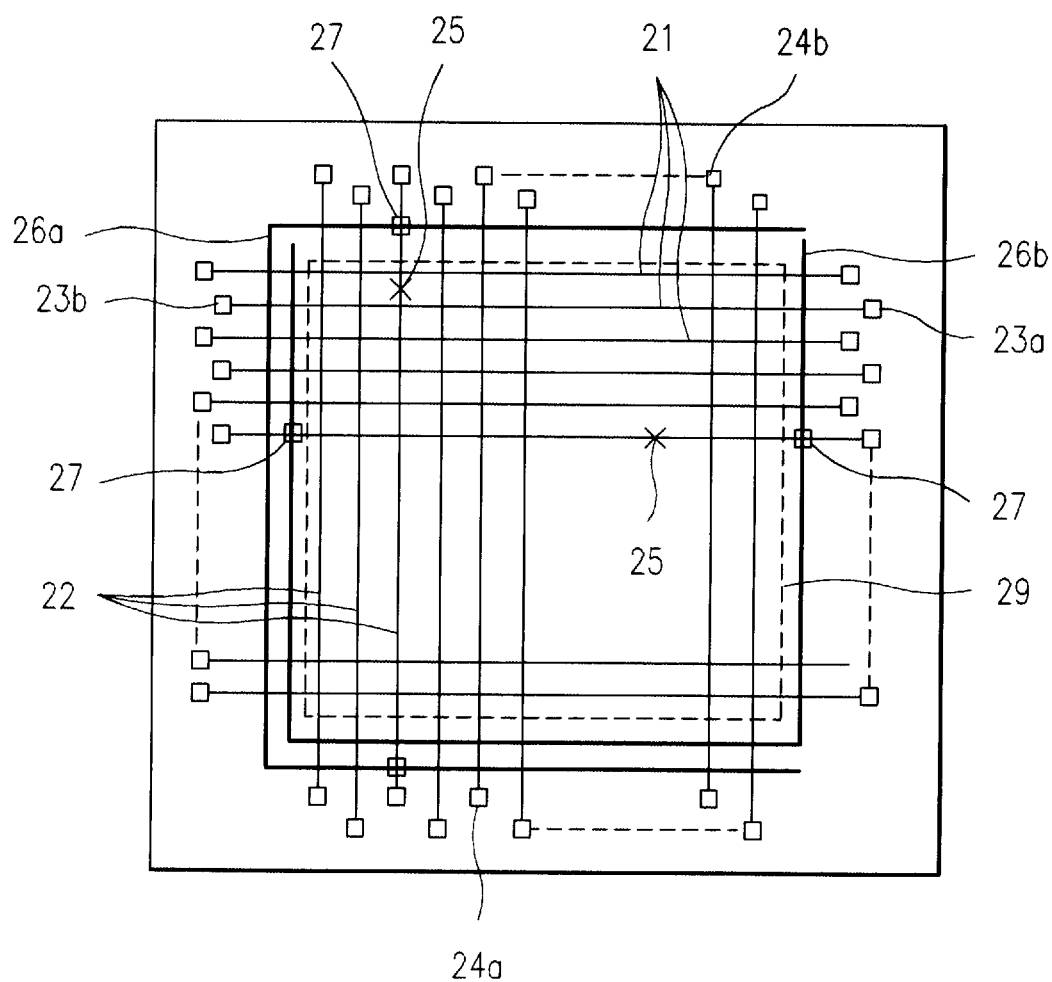
Figure 4D:
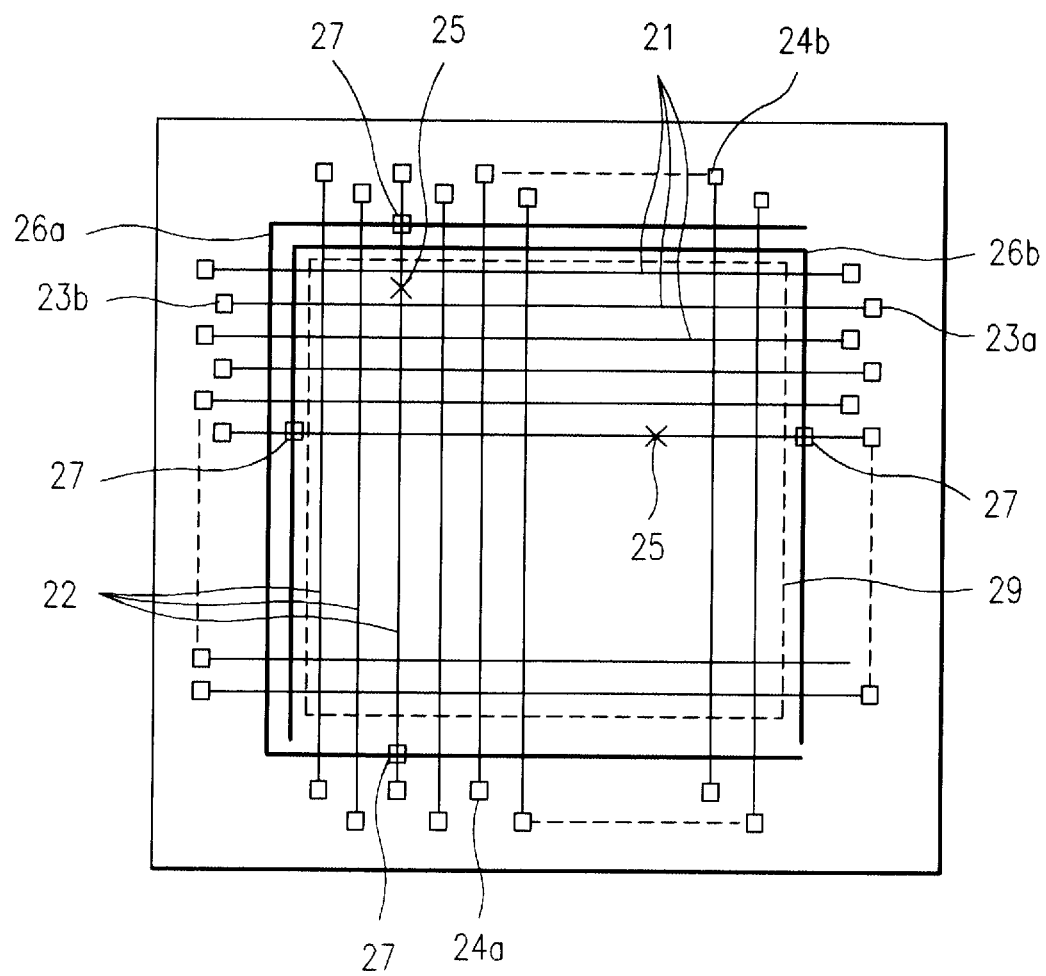

A repair line system of the third embodiment of the present invention is shown in FIGS. 4a–4d and is substantially the same as the repair system described in the first and second embodiments, except with regard to the orientation of the repair lines and the types of repairs that it is capable of effectuating, which will be described in detail below. FIGS. 4a–4d represent alternative embodiments of the third embodiment. In particular, FIGS. 4a–4d illustrate plan views each depicting a repair line system of the present invention capable of repairing one data line and one gate line. The repair lines of the third embodiment are configured such that the first repair line 26a is rotated ±90° relative to the second repair line 26b, as shown in FIGS. 4a–4d. For example, referring to FIG. 4a, the first repair line 26a is oriented 90° with respect to the second repair line 26b. Thus, the first repair line 26a repairs a defective data line and the second repair line 26b repairs a defective gate line. FIGS. 4b–4d are similar to FIG. 4a.

Figure 5:
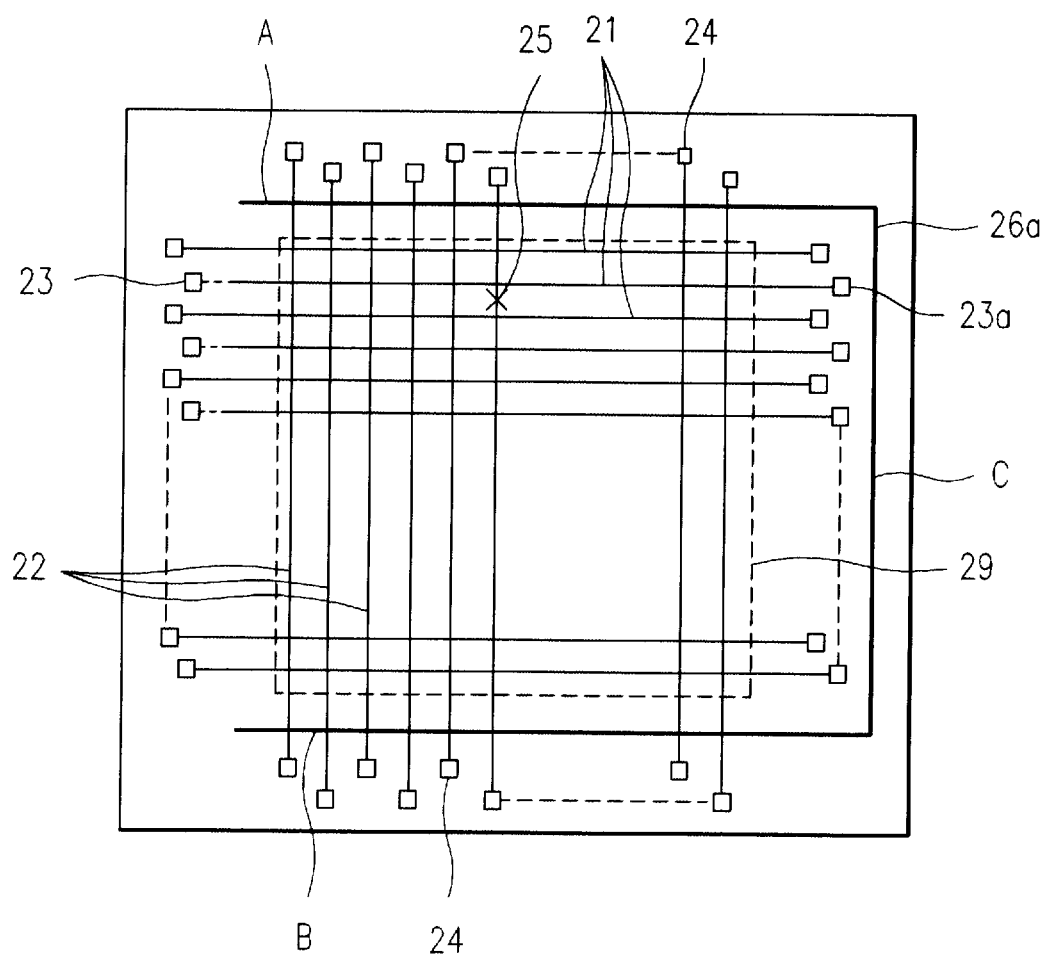
FIG. 5 is a schematic view of a fourth embodiment of a repair line system of the present invention.

FIG. 5 is a schematic view of a fourth embodiment of a repair line system of the present invention. Referring to FIG. 5, a single repair line has first (A), second (B), and third (C) segments surrounding the gate lines and crosses the data lines for repairing a data line. Alternatively, the repair line may be rotated ±90° to repair a gate line similar to the data line. Moreover, additional repair lines may be added to repair multiple signal lines (e.g., two gate lines, two data lines or one of each).

As a plurality of the repair lines are formed side by side on the sides of the signal input/output (on the side where the electrodes to which signals are input and the side opposite to the side from where the electrodes to the foregoing electrodes are present), the repair system for a liquid crystal display in accordance with the present invention has the following advantages.

Figure 1A:
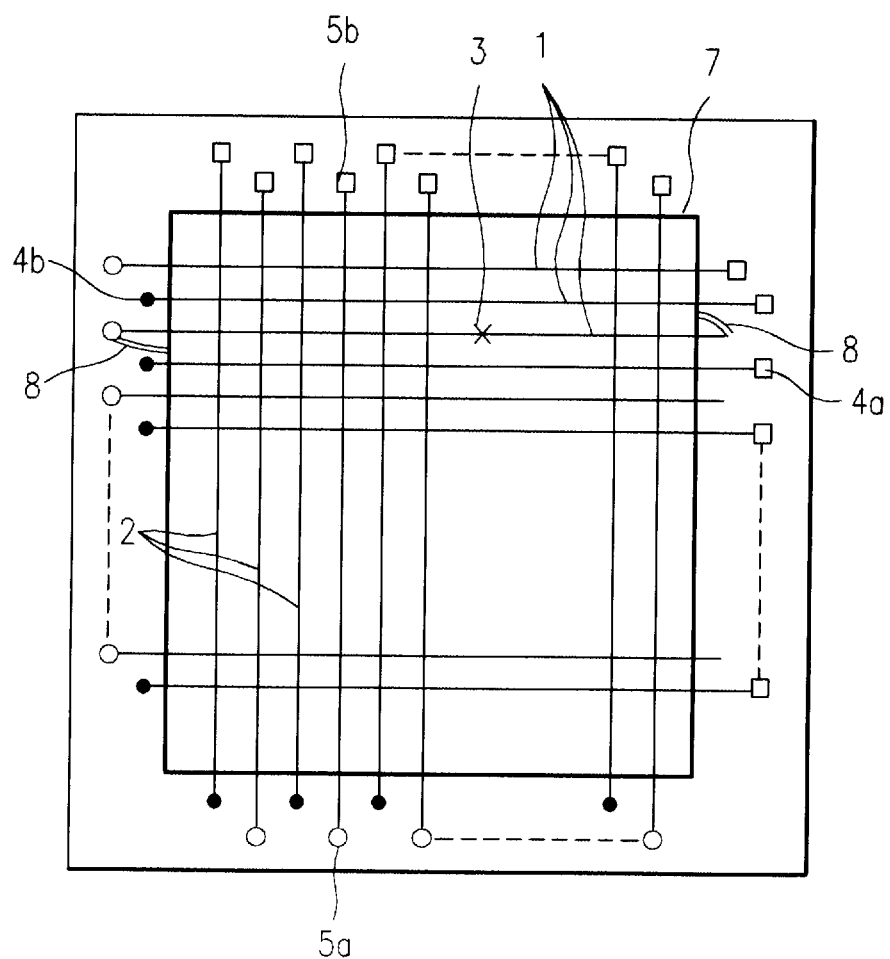
FIGS. 1a and 1b are schematic plan views of conventional repair line systems.
Figure 1B:
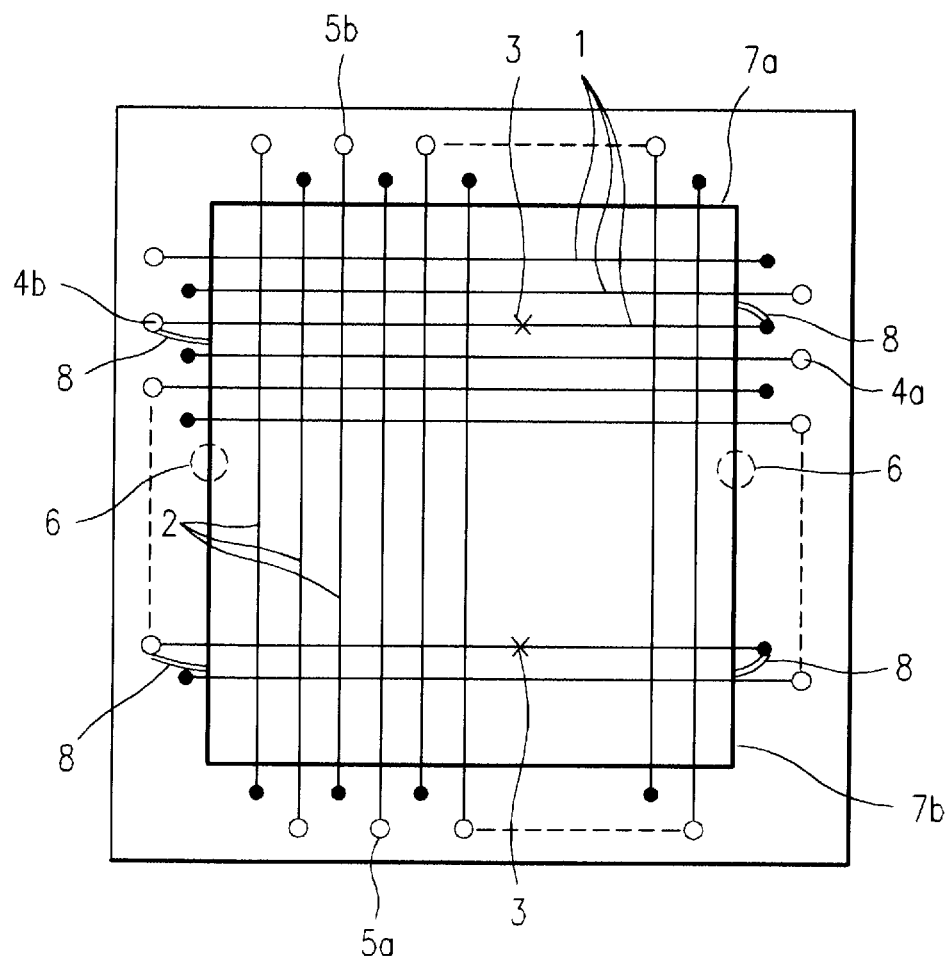

First, the total line length, after a repair of a severed line using the repair line system of the present invention, is shorter than in the case of the closed loop repair system because it omits the length of the two segments of conductor material 8 (FIGS. 1a, 1b). This prevents a drop in the signal transmission performance caused by the additional line resistance.

Second, the availability of efficient plural adjacent line repairs is favorable in view of the yield. When plural lines are severed, they are most likely to lie adjacent to one another, because an error in the manufacturing process that severs one line is more likely to sever an adjacent line as well, rather than another line spaced from the first line. The present invention is capable of repairing such adjacent severed lines.

It will be apparent to those skilled in the art that various modifications and variations can be made in a repair system for a liquid crystal display and a method for repairing a liquid crystal display using the same of the present invention without departing from the spirit or scope of the invention. Thus, it is intended that the present invention cover the modifications and variations of this invention provided they come within the scope of the appended claims and their equivalents.

What is claimed is:

1. A repair system for a liquid crystal display, the liquid crystal display having an array of signal lines including a plurality of gate lines and a plurality of orthogonally disposed data lines crossing the gate lines, a pixel disposed at the crossing point of each gate line and each data line, the pixels collectively defining a display region, the repair system comprising:

first and second C-shaped repair lines, each of the repair lines having a first segment along a first side of the display region and a second segment along a second side of the display region, the first segment being conductively connected to the second segment, the first and second segments capable of repairing any two adjacent ones of the signal lines, wherein each of the repair lines crosses each of the plurality of gate lines and each of the plurality of data lines.

2. The liquid crystal display repair system according to claim 1, wherein the signal lines are data lines.

3. The liquid crystal display repair system according to claim 1, wherein the signal lines are gate lines.

4. The liquid crystal display repair system according to claim 1, further comprising a third segment substantially perpendicular to the first and second segments and conductively connecting the first segment to the second segment.

5. The liquid crystal display repair system according to claim 1, wherein a portion of the signal lines outside of the display region is wider than portions of the signal lines inside the display region.

6. A repair system for a liquid crystal display, the liquid crystal display having an array of signal lines including a plurality of gate lines and a plurality of orthogonally disposed data lines crossing the gate lines, a pixel disposed at the crossing point of each gate line and each data line, the pixels collectively defining a display region, the repair system comprising:

first and second C-shaped repair lines, each of the repair lines having a first segment along a first side of the display region and a second segment along a second side of the display region, the first segment being conductively connected to the second segment, the first and second segments capable of repairing at least one of the data lines and one of the gate lines, wherein each of the repair lines crosses each of the plurality of gate lines and each of the plurality of data lines.

7. The liquid crystal display repair system according to claim 6, wherein a first one of the first and second repair lines crosses both sides of the data lines and a second one of the first and second repair lines crosses both sides of the gate lines.

8. The liquid crystal display repair system according to claim 7, further comprising a third segment substantially perpendicular to the first and second segments and conductively connecting the first segment to the second segment.

9. The liquid crystal display repair system according to claim 6, further comprising a third segment substantially perpendicular to the first and second segments and conductively connecting the first segment to the second segment.

10. A repair system for a liquid crystal display, the liquid crystal display having an array of signal lines including a plurality of gate lines and a plurality of orthogonally disposed data lines crossing the gate lines, a pixel disposed at the crossing point of each gate line and each data line, the pixels collectively defining a display region, the repair system comprising:

first and second C-shaped repair lines, each of the repair lines having a first segment along a first side of the display region and a second segment along a second side of the display region, the first segment being conductively connected to the second segment, the first segment of the first repair line along the first side of the display being arranged substantially parallel and adjacent to the first segment of the second repair line along the first side of the display, wherein each of the repair lines crosses each of the plurality of gate lines and each of the plurality of data lines.

11. The liquid crystal display repair system according to claim 10, wherein the first segment of the first repair line extends in an opposite direction to the first segment of the second repair line.

12. The liquid crystal display repair system according to claim 10, wherein the first segment of the first repair line extends in a same direction to the first segment of the second repair line.

13. The liquid crystal display repair system according to claim 10, wherein a portion of the signal lines outside of the display region is wider than portions of the signal lines inside the display region.

14. A repair system for a liquid crystal display, the liquid crystal display having an array of signal lines including a plurality of gate lines and a plurality of orthogonally disposed data lines crossing the gate lines, a pixel disposed at the crossing point of each gate line and each data line, the pixels collectively defining a display region, the repair system comprising:

a C-shaped repair line having a first segment along a first side of the display region, a second segment along a second side of the display region, and a third segment coupling the first segment to the second segment, the first and the second segments being disposed to cross the signal lines, and the third segment being disposed to not cross the signal lines, wherein the repair line crosses each of the plurality of gate lines and each of the plurality of data lines.

15. The liquid crystal display repair system according to claim 14, wherein the first and second segments cross the gate lines.

16. The liquid crystal display repair system according to claim 14, wherein the first and second segments cross the data lines.

* * * * *

UNITED STATES PATENT AND TRADEMARK OFFICE
CERTIFICATE OF CORRECTION

PATENT NO. : 5,859,679
DATED : January 12, 1999
INVENTOR(S) : In Duk SONG

It is certified that error appears in the above-indentified patent and that said Letters Patent is hereby corrected as shown below:

```
On the title page, item [54] and Column 1, line 1:
```
Title Should Read:

REPAIR SYSTEM FOR LIQUID CRYSTAL DISPLAY USING

C-SHAPED REPAIR LINES AND METHOD FOR REPAIRING

LIQUID CRYSTAL DISPLAY USING THE SAME

Signed and Sealed this

Twenty-fifth Day of May, 1999

Attest:

Q. TODD DICKINSON

*Attesting Officer*     *Acting Commissioner of Patents and Trademarks*